United States Patent [19]

Yue et al.

[11] Patent Number: 5,321,130
[45] Date of Patent: Jun. 14, 1994

[54] UNSYMMETRICAL CYANINE DYES WITH A CATIONIC SIDE CHAIN

[75] Inventors: Stephen T. Yue; Iain D. Johnson; Zhijian Huang; Richard P. Haugland, all of Eugene, Oreg.

[73] Assignee: Molecular Probes, Inc., Eugene, Oreg.

[21] Appl. No.: 833,006

[22] Filed: Feb. 10, 1992

[51] Int. Cl.$^5$ .................... C07H 21/02; C07H 21/04
[52] U.S. Cl. .................... 536/23.1; 435/968; 436/800; 546/165; 546/176; 546/270; 546/271
[58] Field of Search .................... 435/6, 968; 546/176, 546/165, 270, 271; 536/23.1; 436/800

[56] References Cited

U.S. PATENT DOCUMENTS 2,269,234  1/1942  Sprague ........................... 260/304
4,883,867 11/1989  Lee et al. ........................... 536/28

OTHER PUBLICATIONS

Barni et al., Helv. Chim. Acta., 64(6) (1981); pp. 1943–1948.
Brooker, et al., J. Am. Chem. Soc. 64, 199 (1942).
Lee, et al., *Thiazole Orange: A New Dye for Reticulocyte Analysis*, Cytometry 7, 508–517 (1986).
Griffiths, Colour and Constitution of Organic Molecules, pp. 241 Academic Press (1976).
Rago et al., Analytical Biochemistry 191, 31 (1990).
Houben–Weyl Methoden Der Organischen Chemie, Band V/1d, pp. 231–299 (1972).

*Primary Examiner*—Amelia Burgess Yarbrough
*Attorney, Agent, or Firm*—Allegra J. Helfenstein

[57] ABSTRACT

The invention relates to unsymmetrical cyanine dyes with a cationic side chain, typically benzothiazole or benzoxazole derivatives, that exhibit enhanced fluorescence on binding with DNA or RNA, where such fluorescence can be used for evaluating the presence of nucleic acid polymers. The dyes generally have the formula:

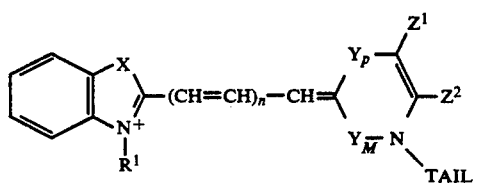

where $R^1$ is an alkyl group having 1–6 carbons;
X is O, S, or $NR^2$, where $R^2$ is an alkyl group having 1–6 carbons, or $CR^3R^4$, where $R^3$ and $R^4$, which may be the same or different, are alkyl groups having 1–6 carbons;
n = 0, 1, or 2;
$Z^1$ and $Z^2$, which may be the same or different, are independently hydrogen, an alkyl group having 1–6 carbons, or aryl, or $Z^1$ and $Z^2$ taken in combination complete a 6-membered aromatic ring;
Y is HC=CH; and
each of P and M = 0 or 2, such that P+M = 1; and
TAIL is an aminoalkyl chain containing a backbone of 3–42 carbons and 1–5 positively charged nitrogens intermittently or equally spaced within the backbone, such that there are at least two carbons between sequential nitrogens.

23 Claims, 6 Drawing Sheets

Figure 4(A)-4(D)
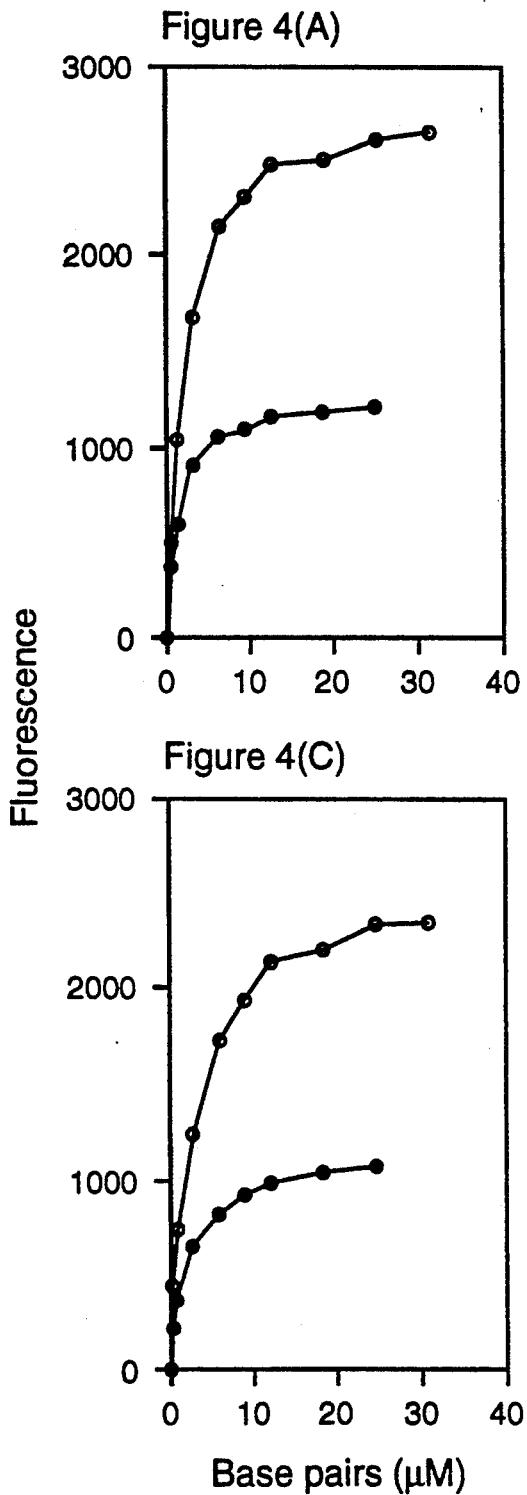
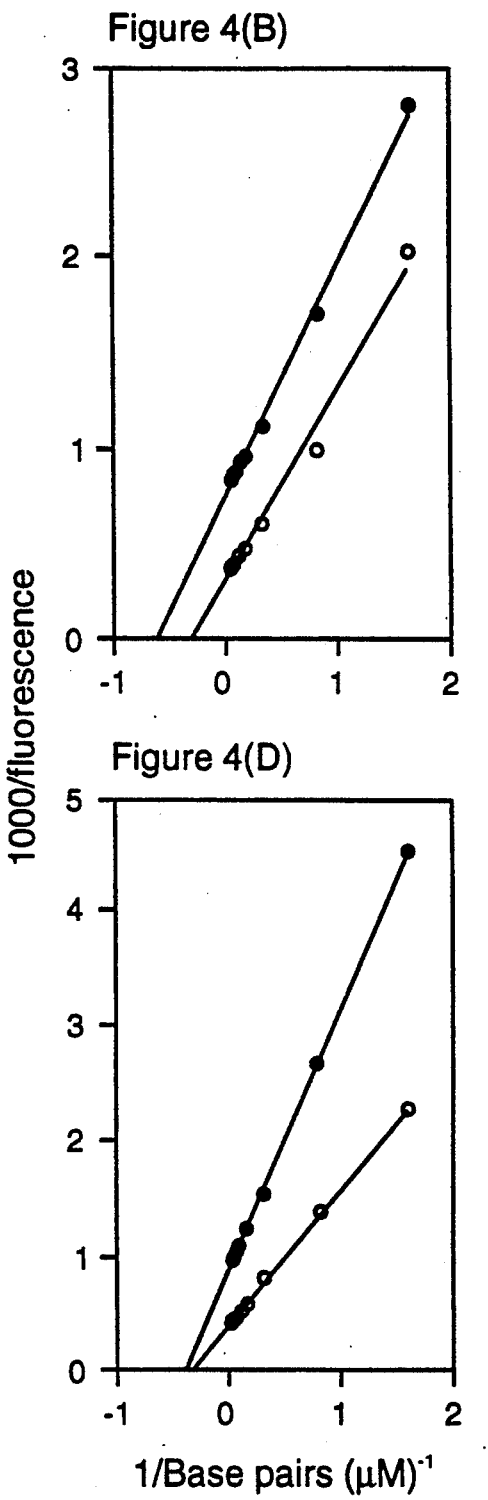

ant_5,321,130

UNSYMMETRICAL CYANINE DYES WITH A CATIONIC SIDE CHAIN

FIELD OF THE INVENTION

The invention relates to novel fluorescent dyes. In particular, the invention relates to unsymmetrical cyanine dyes with a cationic side chain. The dyes are useful for nucleic acid staining.

BACKGROUND OF THE INVENTION

Fluorescent dyes have many uses and are known to be particularly suitable for biological applications in which the high detectability of fluorescence is desirable. By binding to a specific biological ingredient in a sample, a fluorescent dye can be used to indicate the presence or the quantity of the specific ingredient in a sample. A variety of fluorescent dyes are available for specific fluorescent staining and quantitation of DNA and RNA, and other applications involving nucleic acids.

Unsymmetrical cyanine dyes were described long before much was known about DNA, by Brooker, et al., *J. AM. CHEM. SOC.* 64, 199 (1942). Some dyes in this class have since been found to be useful in fluorescent staining of DNA and RNA. The dye sold under the name Thiazole Orange has particular advantages in the quantitative analysis of immature blood cells or reticulocytes. U.S. Pat. No. 4,883,867 to Lee, et al. (1989) ('867 patent); Lee, et al., *Thiazole Orange: A New Dye for Reticulocyte Analysis*, CYTOMETRY 7, 508 (1986). As indicated in the '867 patent to Lee, et al., the dye used for this purpose must be able to penetrate the cell membrane.

The inventors have discovered that a composition that includes a side chain with additional positive charges is a polar compound that is unable to readily penetrate cell membranes. Nevertheless, the dye discovered by inventors is highly useful as a stain for nucleic acids because it has an extremely high affinity for nucleic acid polymers that is greater than that of the parent compounds (e.g. thiazole orange, oxazole yellow, thiazole red). The dyes of the invention are sensitive to even small quantities of nucleic acid polymers not contained inside living cells, e.g. in cell extracts, as well as to nucleic acids in permeabilized cells, such as dead or fixed cells. The combination of dye with nucleic acid polymers generally results in fluorescence that is linearly related to the amount of polymer present in the sample.

The novel fluorescent dyes is similar to another discovery of inventors, DIMERS OF UNSYMMETRICAL CYANINE DYES (Ser. No. 07/761,177 filed Sep. 16, 1991 by Yue, Johnson & Haugland). The dimer compounds contain two unsymmetrical cyanine dye units linked by a bridge having one or more positive charges, whereas the monomer dyes of the instant invention contain only one unsymmetrical cyanine dye unit. The affinity of the dimer for nucleic acid polymers is even greater than that of the subject invention. For some applications high affinity may cause problems where removal of the dye to allow recovery of the nucleic acid polymers is desired.. It is advantageous to have a dye that has an affinity for nucleic acids that is not so strong as to require harsh conditions to separate the bound dye from the nucleic acid, yet is strong enough to permit rapid binding to and quantitative detection of the polymer, with minimum background from unbound dye. In addition, the monomer dye with cationic side chain unexpectedly shows less optical deterioration in aqueous solutions than the dimer. This characteristic of the monomer dyes in aqueous solutions is advantageous in that the dye continues to be useful in the evaluation of nucleic acids even under prolonged experimental conditions.

Absorption spectra of solutions of Compounds 1-8 (4 $\mu$M) in pH 7.4 buffer (10 mM Tris, 1 mM EDTA and 50 mM NaCl) are recorded on a Perkin-Elmer Lambda 6 spectrophotometer after the addition of sufficient calf thymus DNA (Sigma Chemical Co. D-1501) to yield a ratio of 50 DNA base pairs per dye molecule or greater. The spectra are normalized to a maximum absorbance of 1.0 by numerical rescaling.

Figure 2:
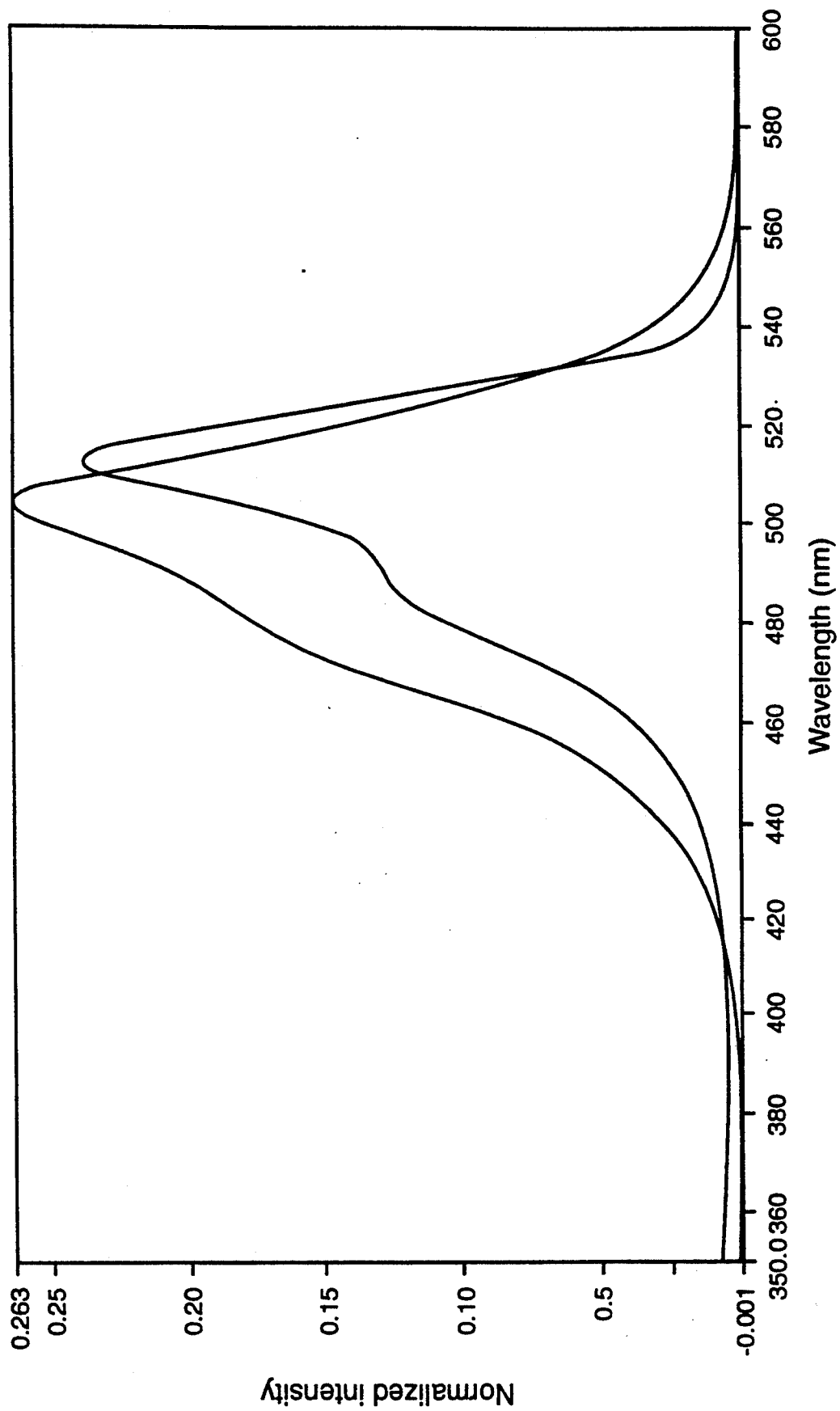

FIG. 2. Effect of DNA Binding on the Absorption Spectrum.

Figure 1:
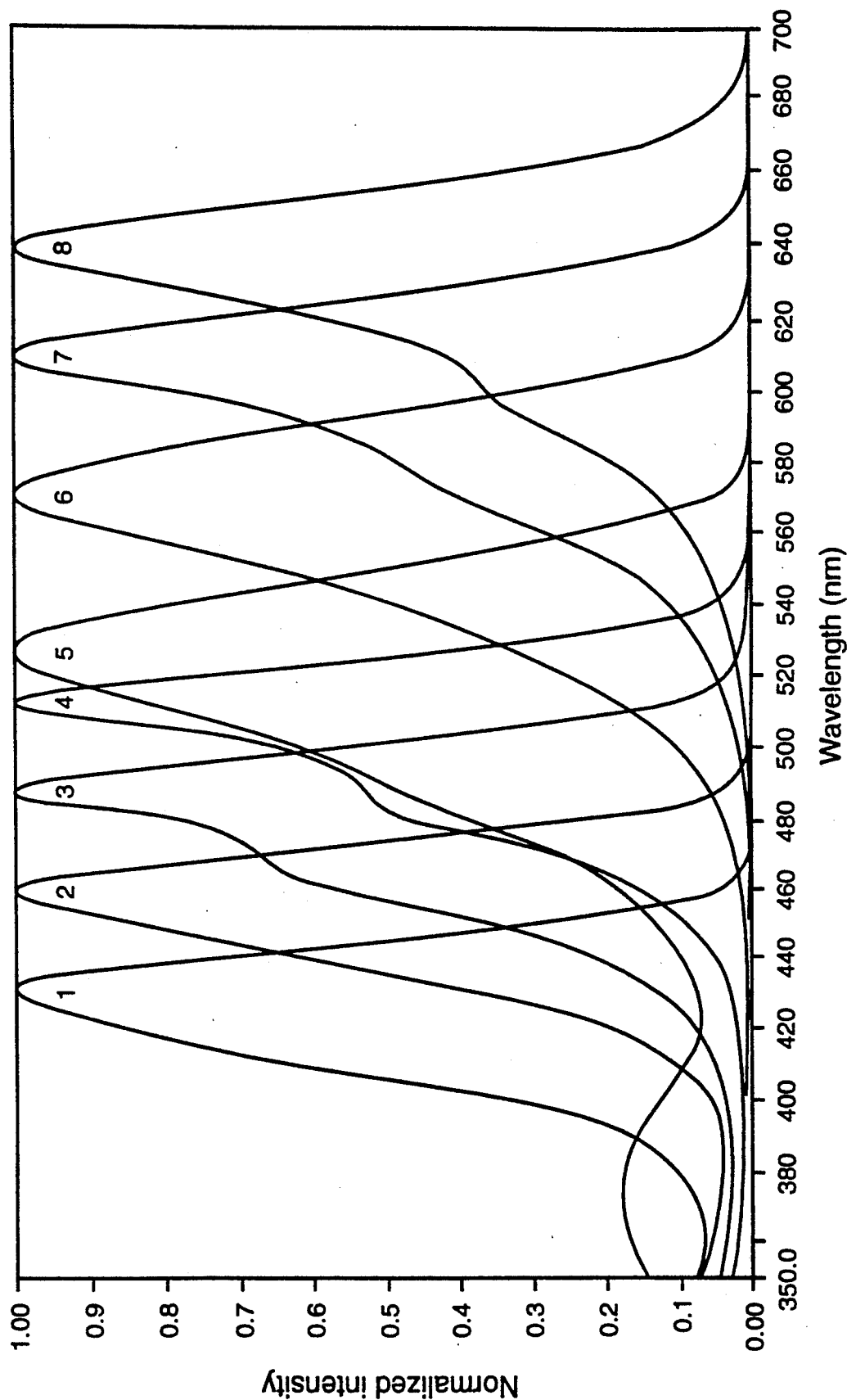
FIG. 1. Normalized Absorption Spectra of Nucleic Acid Stains.

The absorption spectrum of Compound 4 in buffer, prepared as for FIG. 1, is recorded on a Perkin-Elmer Lambda 6 spectrophotometer before and after addition of calf thymus DNA. The spectra are not rescaled, illustrating the changes in extinction coefficient and absorption wavelength range accompanying binding to DNA.

Figure 3:
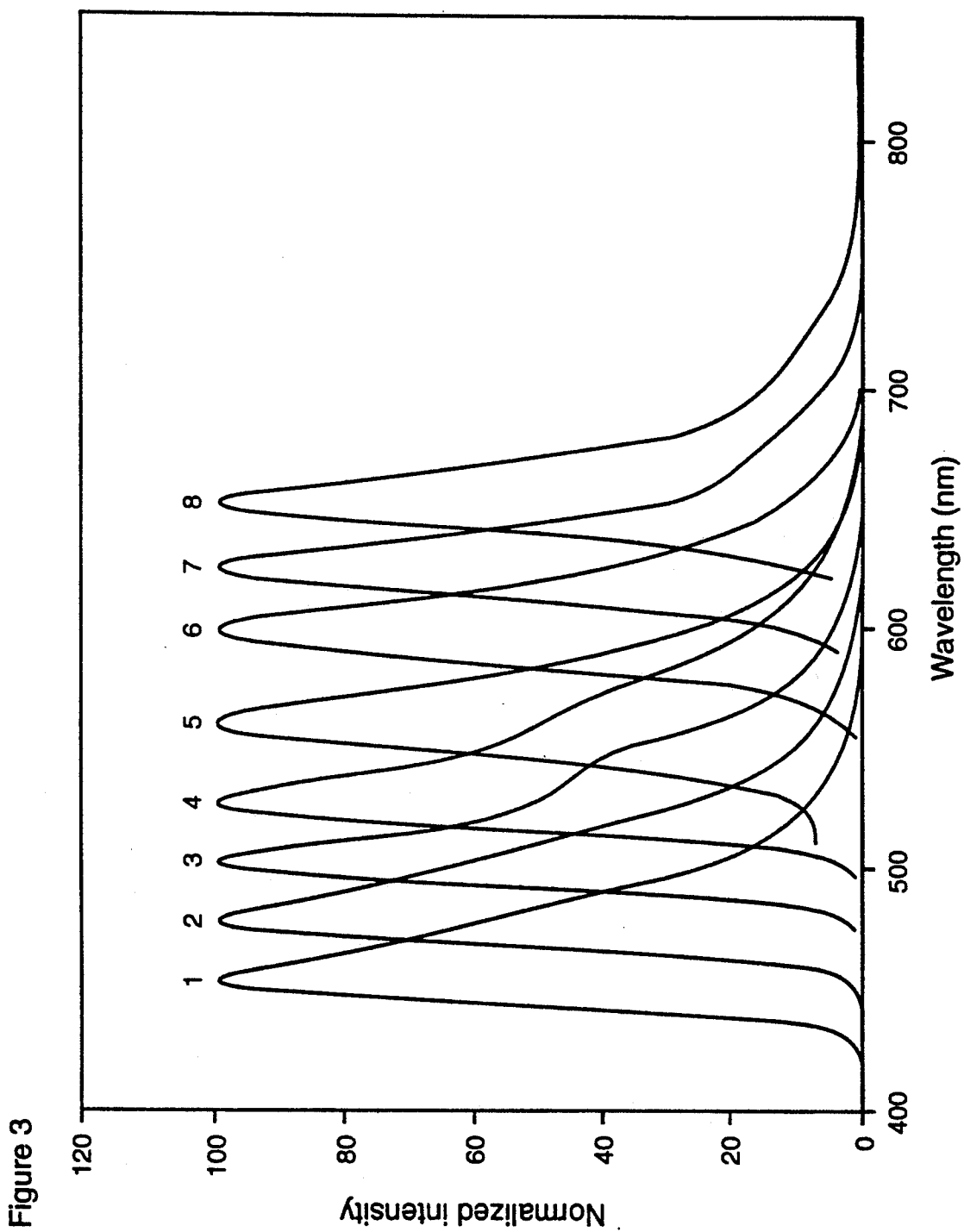

FIG. 3. Normalized Fluorescence Spectra.

Fluorescence emission spectra of solutions (0.4 $\mu$M) of Compounds 1-8 in pH 7.4 buffer (10 mM Tris, 1 mM EDTA and 50 mM NaCl), after sufficient calf thymus DNA (Sigma Chemical Co. D-1501) is added to yield a ratio of 50 DNA base pairs per dye molecule or greater, are recorded on an Alphascan spectrofluorometer (PTI Inc.) with excitation at approximately ($\lambda_A$-25 nm) where $\lambda_A$ is the absorption maximum of the dye bound to DNA (Table 2). Normalization of all the spectra to a maximum intensity of 100 by numerical rescaling demonstrates the fluorescence wavelength ranges for the different dyes.

FIG. 4(A)-4(D). Affinity for DNA

FIG. 4(A) demonstrate the fluorescence enhancements of 0.22 $\mu$M (open circles) and 0.1 $\mu$M (filled circles) solutions of Compound 4 titrated by calf thymus DNA in a binding buffer (10 mM phosphate pH 7.0 with 1 mM EDTA and 100 mM NaCl), keeping dye concentrations constant. From a plot of 1/F versus 1/B (FIG. 4(B)) the apparent affinity $K_p$ is obtained from the X-intercept. This value is larger with 0.1 $\mu$M dye than with 0,22 $\mu$M. The addition of 10% ethanol, as shown in FIGS. 4(C) and 4(D), results in a common $K_p$ of $2.0 \cdot 10^7$ for 0.1 and 0.22 $\mu$M of Compound 4, however, ethanol decreases the DNA affinity (decreases $K_p$).

Figure 5:
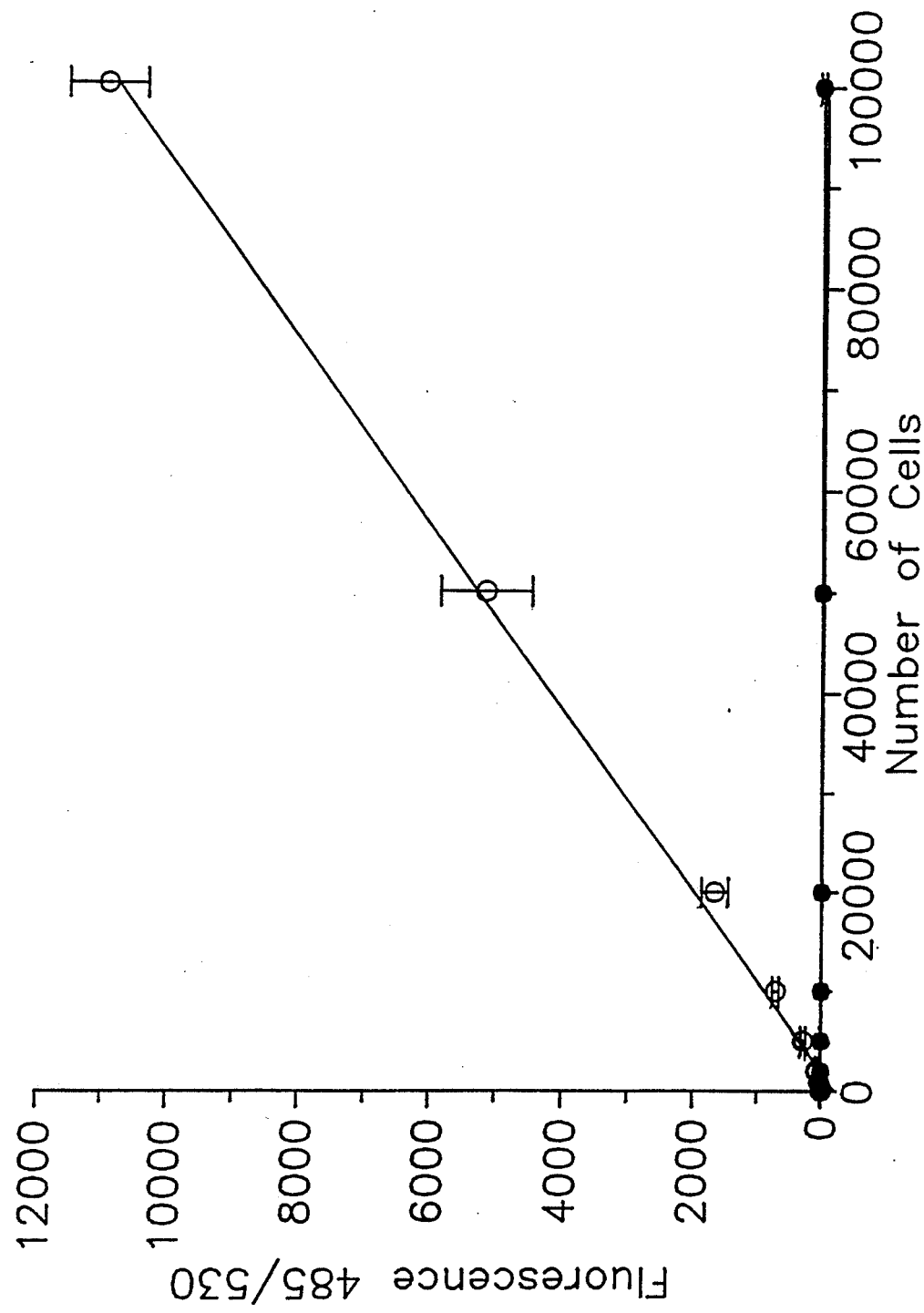

FIG. 5. Analysis of Cellular DNA Content

Mouse fibroblast 3T3 cells aliquoted into microtiter plates are subjected to a freeze/thaw protocol to lyse cells and release DNA into solution. Compound 3 in TNE buffer is added to each well and the plates are scanned in a Cytofluor 2350 microtiter plate reader (Millipore Corp.) with excitation at 485 nm and emission detected at 530 nm. The linear increase of fluorescence with cell number is plotted (open circles). Treatment of half the wells with 20 $\mu$g/ml DNAse 1 for one hour at 37° C. in DNAse 1 buffer (10 mM $MnCl_2$, 50 mM TRIS, pH 7.7) eliminates more than 95% of the fluorescence (filled circles).

Figure 6:
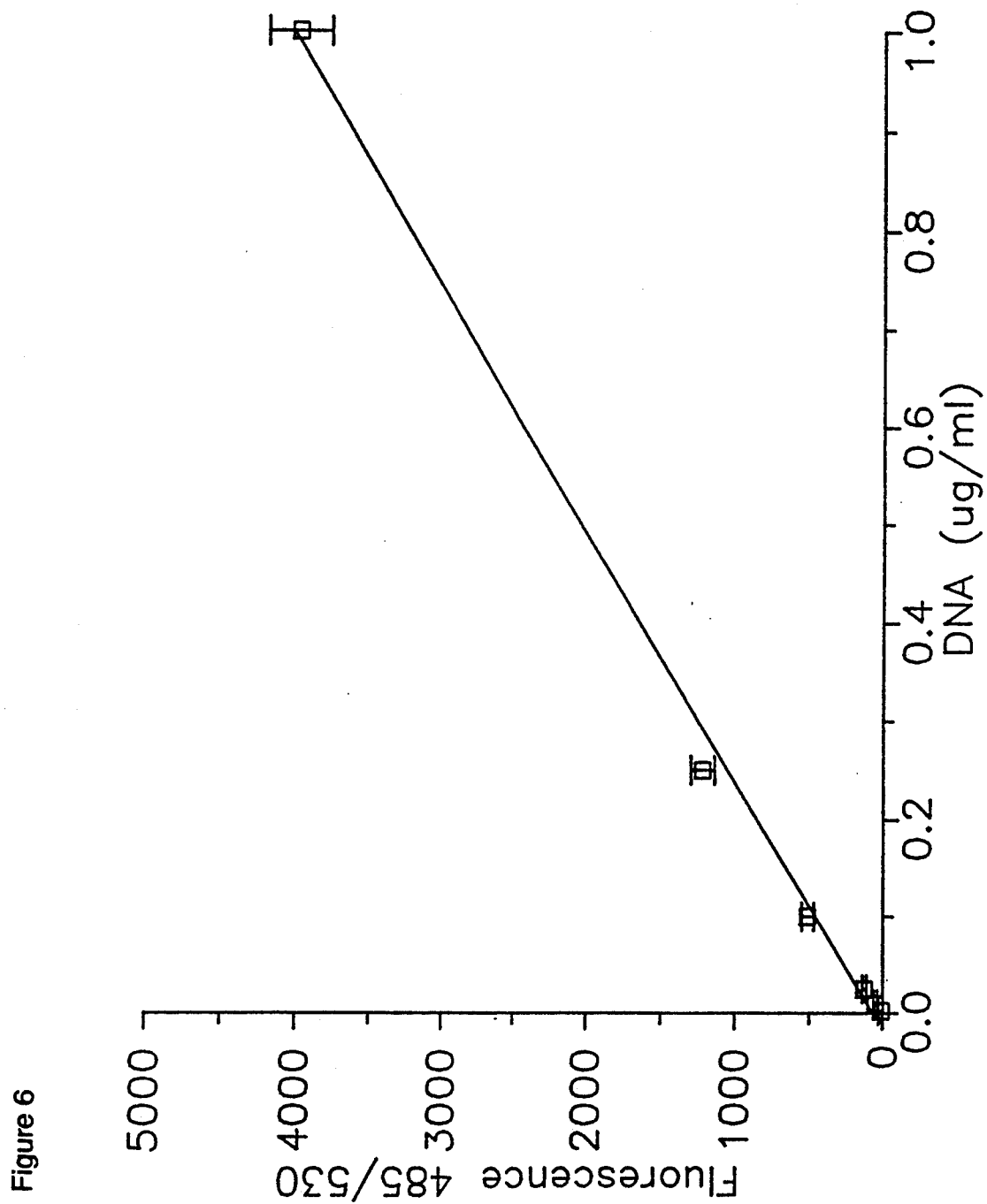

FIG. 6. Titration of DNA in Solution

Fluorescence intensity of a 1 μM solution of Compound 3 is plotted against DNA concentration expressed as μg/mL. The linear analytical range is 0.0025 to 1.0 μg DNA/mL (or 0.5 to 200 ng total DNA in the 200 μL experimental samples). Fluorescence is measured on a Millipore Cytofluor 2300 with excitation at 485 nm and emission at 530 nm.

DESCRIPTION OF PREFERRED EMBODIMENTS

The dye of this invention is an unsymmetrical cyanine fluorophore with a side chain or TAIL containing from one to five positive charges. The unsymmetrical cyanine fluorophore has two aromatic ring groups joined by an unsaturated hydrocarbon chain containing one or more methine groups. The novel dyes generally have the formula:

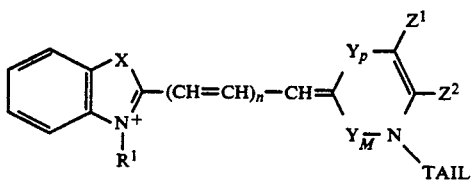

The first aromatic ring group of the fluorophore contains two fused rings. The ring substituent $R^1$ is a lower alkyl group. X is O, S, or N—$R^2$, where $R^2$ is a lower alkyl group, or $CR^3R^4$, where $R^3$ and $R^4$, which may be the same or different, are lower alkyl groups. As used in this document, lower alkyl group means an alkyl group having 1-6 carbons. Preferably $R^1$, $R^2$, $R^3$, and $R^4$, which may be the same or different, have 1-3 carbons. More preferably, $R^1$, $R^2$, $R^3$, and $R^4$ are methyl.

In one embodiment of the invention, the first aromatic ring group of the fluorophore is a benzoxazole where X is oxygen. In another embodiment of the invention, the first aromatic ring group of the fluorophore is a benzothiazole where X is sulfur. In a further embodiment of the invention, the first aromatic ring group of the fluorophore is a benzimidazole where X is an N-lower alkyl group. In yet another embodiment of the invention, the fluorophore is an indoline, where X is a carbon di-substituted by lower alkyl groups.

The second aromatic ring group of the fluorophore contains a single or double aromatic ring, i.e. the second aromatic ring group is a quinoline or a pyridine. The ring substituents $Z^1$ and $Z^2$, which may be the same or different, are hydrogen, lower alkyl groups, aryl, or $Z^1$ and $Z^2$ taken in combination with two aromatic carbons of ring A complete a 6-membered aromatic ring fused to ring A.

In the methine bridge linking the aromatic ring groups of the fluorophore, the subscript n equals 0, 1 or 2, which determines the distance between the two aromatic ring groups of the fluorophore. As is known for cyanine dyes, [Griffiths, COLOUR AND CONSTITUTION OF ORGANIC MOLECULES, pp. 241 Academic Press (1976)], increasing the length of the polymethine bridge between the heterocyclic terminal groups results in a shift of the absorption spectrum to longer wavelengths. Generally, increasing the spacing between the two aromatic ring groups (increasing n) results in a fluorophore that has a longer wavelength absorption and emission maximum. For example, in one embodiment of the invention where n=0, the dye generally emits in the blue or green to yellow region (about 450 to about 550 nm). In the embodiment where n=1, the dye generally emits in the orange to red region (about 550 to about 670 rim). In the embodiment where n=2, the dye generally emits in the deep red to infrared region (greater than about 670).

Y is HC=CH, the position of which is indicated by the subscripts P and M, both of which equal 0 or 1. When M=1, P=0 and vice versa. Preferably M=1. When M=1, the dye has the following structure:

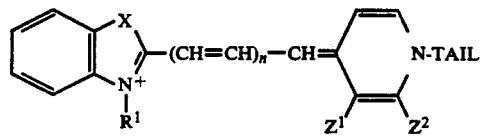

The side chain or TAIL portion of the dye molecule is an aminoalkyl chain containing a backbone of two to about 42 carbon atoms. The carbon backbone is interspersed at one or more regular or irregular intervals with cationic nitrogens (TAIL nitrogens), such that the TAIL portion of the molecule contains at least one and as many as five positive charges.

TAIL has the general formula:

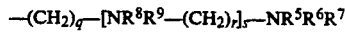

—$(CH_2)_q$—$[NR^8R^9$—$(CH_2)_r]_s$—$NR^5R^6R^7$

The subscript s indicates the number of additional TAIL nitrogens. Where the TAIL contains only a terminal nitrogen, s=0. Increasing the number of charges tends to increase the affinity of the dye for nucleic acids. Preferably, TAIL contains 1, 2 or 3 cationic nitrogens (s=0-2).

The substituents of the terminal TAIL nitrogen ($R^5$, $R^6$, and $R^7$), which may be the same or different, are independently hydrogen or an alkyl group having 1-6 carbons. Other TAIL nitrogen substituents, $R^8$ and $R^9$, (when present) are independently hydrogen or an alkyl group having 1-6 carbons. Each TAIL nitrogen substituent may be the same as or different from any other TAIL nitrogen substituent. Preferably the TAIL nitrogen substituents are alkyl groups having 1-2 carbons, more preferably all the substituents are methyl groups.

There are at least two and as many as b 12 carbon atoms separating the nearest TAIL nitrogen from the nitrogen at the point of attachment on the cyanine dye fluorophore (q=2-12). Preferably there are less than five carbons between the nearest nitrogen to the point of attachment to the fluorophore (q<5). More preferably the nearest nitrogen is three carbons away from the point of attachment (q=3). Each TAIL nitrogen is separated from other TAIL nitrogens by at least 2 and as many as 6 carbons (r=2-6). Preferably the nitrogens are separated by 2-4 carbons (r=2-4).

The dyes are preferably synthesized from iodoalkyl cyanine starting materials prepared according to methods known in the art, see, e.g., U.S. Pat. No. 2,269,234 to Sprague (1942); Brooker et al., supra; HOUBEN-WEYL METHODEN DER ORGANISCHEN CHEMIE, Band V/1d, pp. 231-299 (1972); and Lee et al., CYTOMETRY 7, 508-517 (1986). The appropriate cyanine iodide precursors are heated in a suitable solvent, such as methanol, for several hours, in the presence of about 10 equivalents of the alkylamine containing the number of nitrogens desired for the TAIL portion of the molecule. After the solution is cooled, the crude product collected by filtration, then purified by recrystallization. Table 1 contains the structures of 14 representative compounds and the precursors from which they are prepared (according to Example 1).
TABLE 1
Precursors Used to Synthesize Compounds 1–14
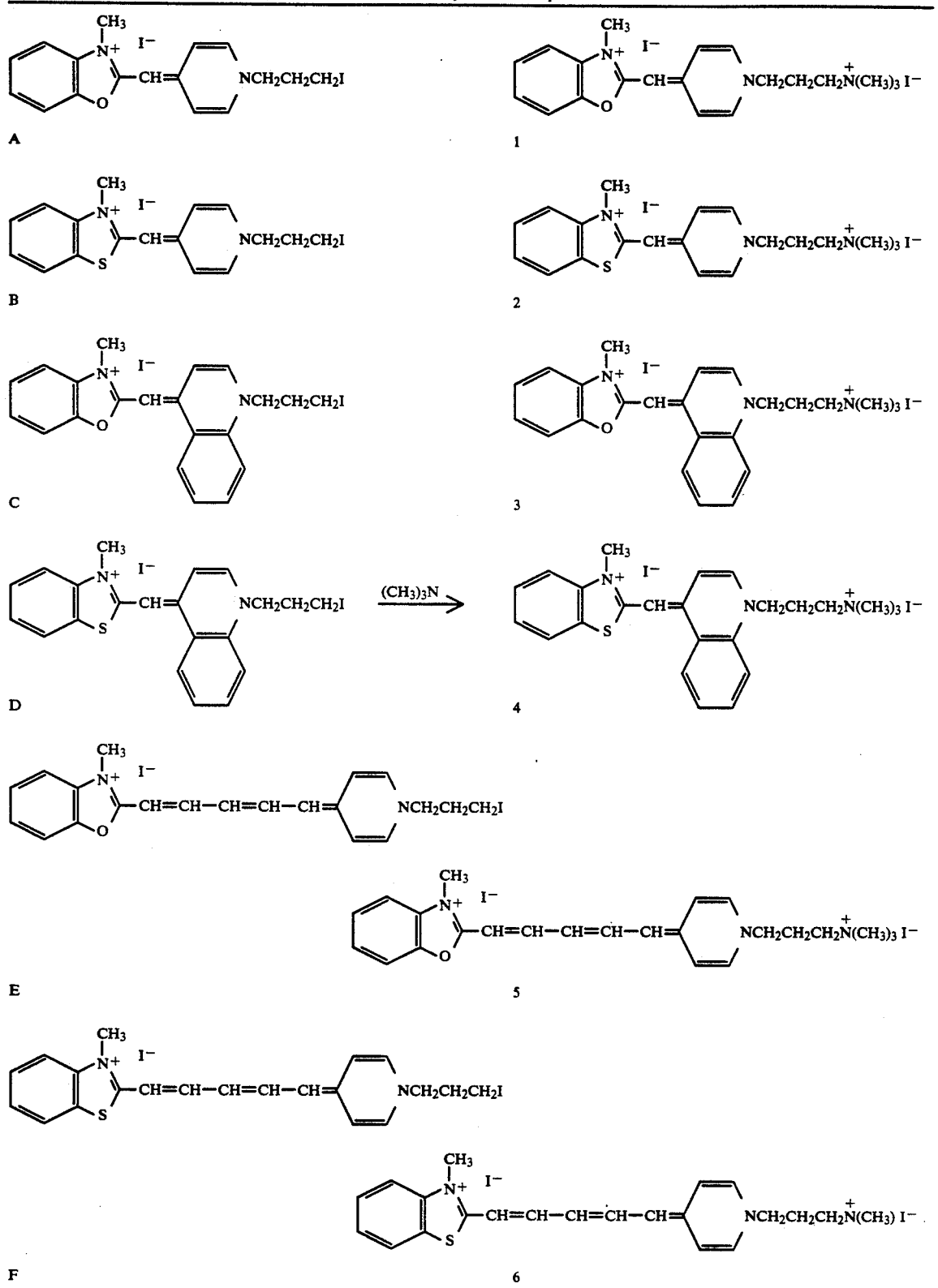

TABLE 1-continued
Precursors Used to Synthesize Compounds 1-14
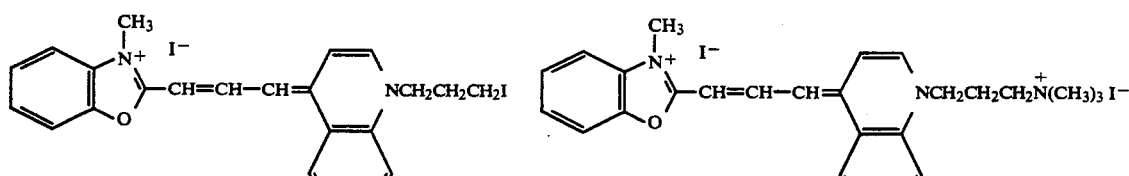
G    7
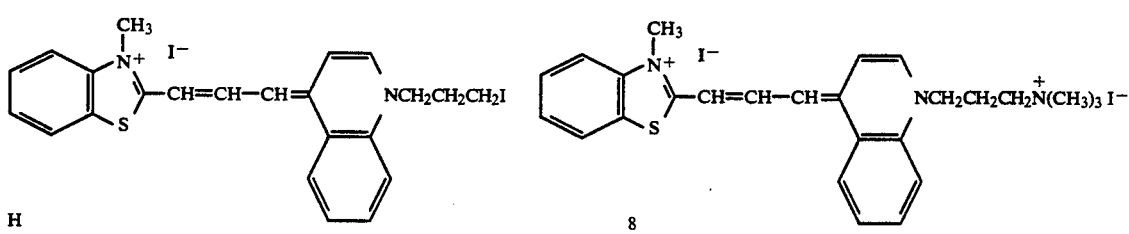
H    8
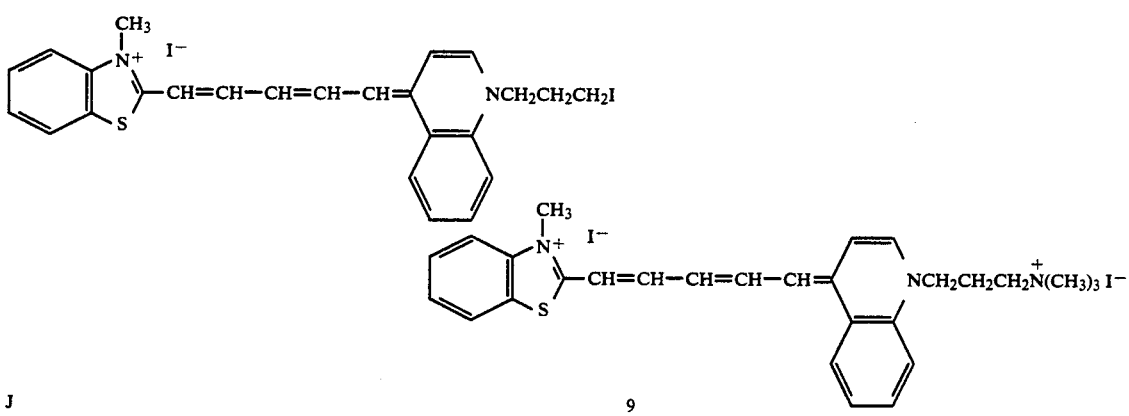
J    9
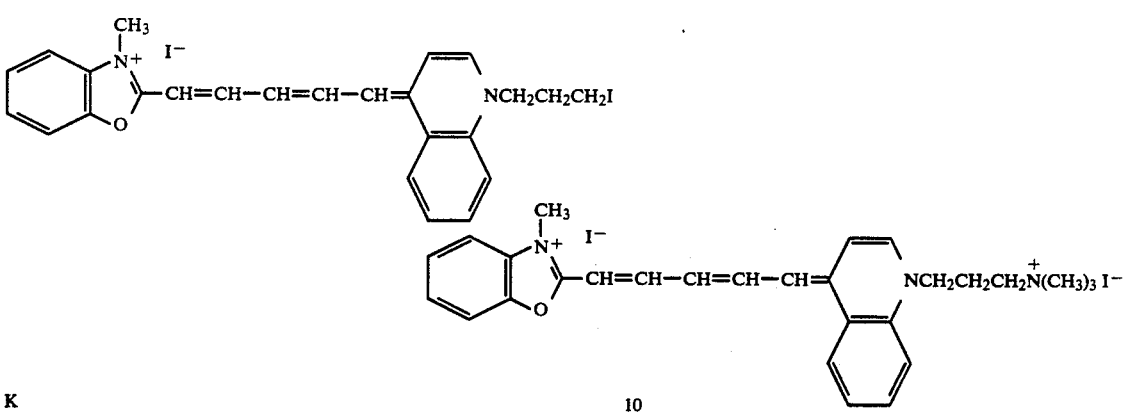
K    10
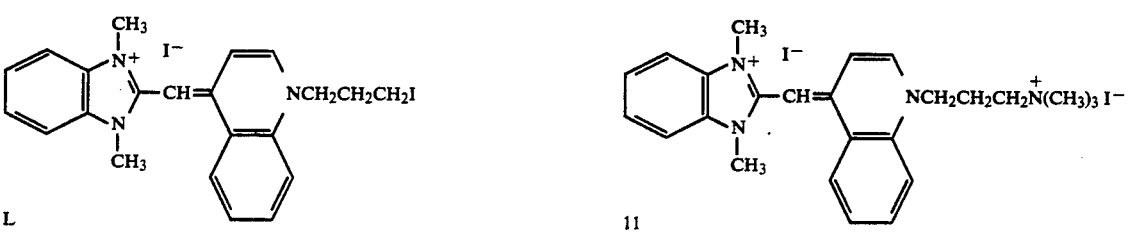
L    11

TABLE 1-continued
Precursors Used to Synthesize Compounds 1-14

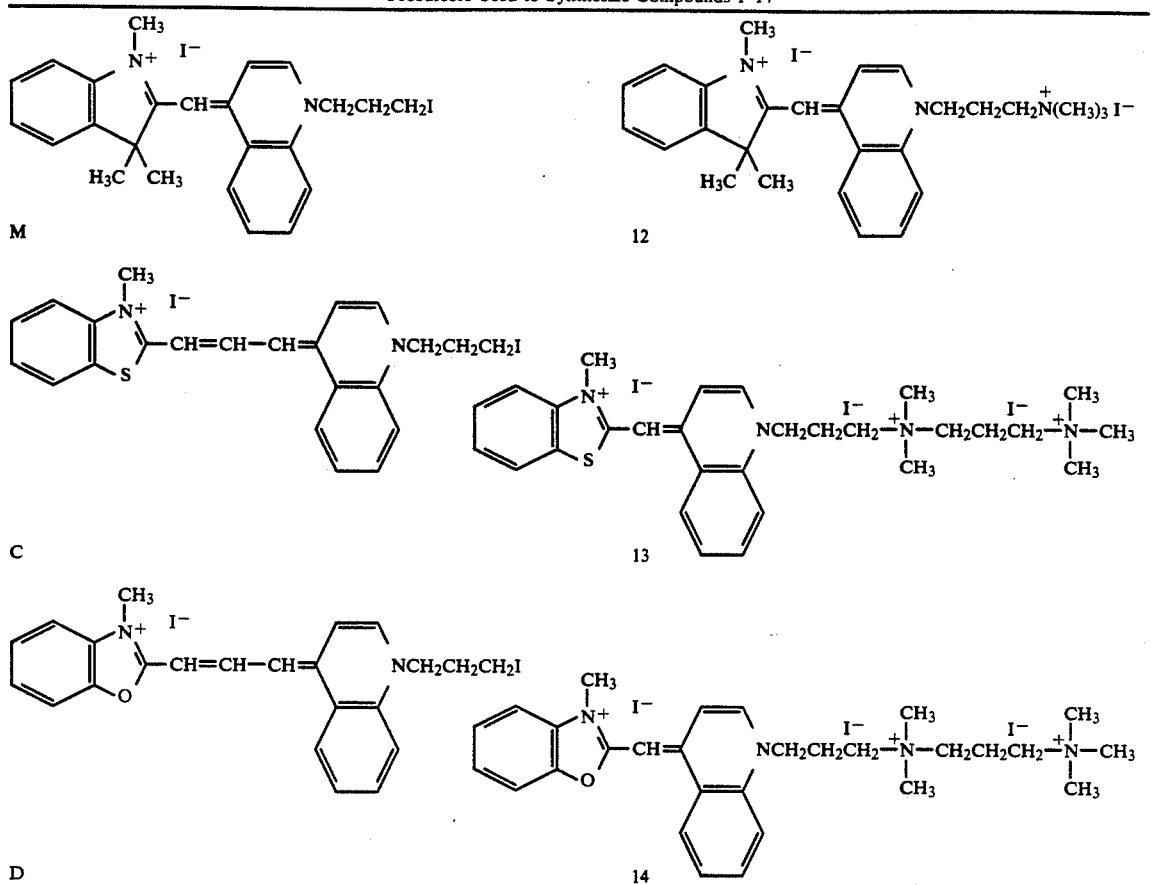

The spectral properties of the novel dyes are similar to, but different from, those of known cyanine compounds, particularly where n=0. Where the number of carbon atoms between the aromatic ring groups of the fluorophore is increased, the absorption and emission maxima are also increased. In solution, the novel dyes exhibit a strong longest wavelength absorption peak in the range from about 400 nm to about 750 nm, however the dyes generally provide only a negligible fluorescence emission peak unless bound to nucleic acids.

Upon binding with DNA or RNA, the optical properties of the dyes change significantly. The enhanced fluorescence of the dyes in the bound versus unbound state is exemplified in Table 2. In particular, the absorption curve typically shifts to a longer wavelength. Typically, the absorption curve shift is between about 5 and about 20 nm. Generally, the bound dye also exhibits strong fluorescence. When combined with nucleic acid polymers, the novel dyes of this invention generally have a Stokes shift of between about 15 to about 30 nm. Table 2 includes the excitation and emission maxima ($\lambda_A$ and $\lambda_F$ respectively) for Compounds 1-8.

Spectral Maxima and Extinction Coefficients for Representative Nuclear Stains

| Cmpd | Methanol | | pH 7.4 | | pH 7.4 + DNA | | pH 7.4 + DNA | |
|---|---|---|---|---|---|---|---|---|
|  | $\lambda_A$ | $\epsilon_{max}$ | $\lambda_A$ | $\epsilon_{max}$ | $\lambda_A$ | $\epsilon_{max}$ | $\lambda_F$ | Enhancement* |
| 1 | 423 | 77,500 | 423 | 75,500 | 435 | 50,100 | 455 | 456x |
| 2 | 452 | 80,200 | 451 | 76,200 | 462 | 58,100 | 481 | 892x |
| 3 | 482 | 72,600 | 481 | 66,000 | 491 | 52,013 | 509 | 925x |
| 4 | 507 | 73,800 | 506 | 68,500 | 515 | 62,800 | 531 | 1806x |
| 5 | 525 | nd | 523 | nd | 532 | nd | 562 | 9x |
| 6 | 564 | nd | 560 | nd | 575 | nd | 599 | 29x |
| 7 | 600 | 133,100 | 596 | 122,000 | 612 | 100,100 | 631 | 155x |
| 8 | 635 | 143,200 | 631 | 98,200 | 642 | 102,000 | 661 | 80x |

$\lambda_A$ (absorption maximum) and $\lambda_F$ (fluorescence maximum) in nm
$\epsilon_{max}$ (extinction coefficient) in $M^{-1} cm^{-1}$
nd = Values not determined due to insufficient sample/low purity.
*Enhancement defined as (QY + DNA)/QY − DNA) at a DNA:fluorophore ratio of 50 bp:1 or greater.

It is worth noting that the argon ion laser, a high power source for fluorescence excitation, has principle output lines at 488 nm and 514 nm, which coincide closely with the excitation maxima of at least two of the novel dyes in the monomethine embodiments. Changing the spacing of the aromatic groups (changing n) in the fluorophore to vary its spectral characteristics provides several dyes having similar chemical structures but detectably different colored fluorescence, allowing the user to take advantage of different laser excitation systems individually or in combination (see FIGS. 1, 2 and 3; Table 2). For instance, the 543 nm line of the green HeNe laser can be used to near optimally excite Compounds 4 and 5. The 568 nm line of the Kr laser can be used to excite Compounds 6 and 7. The 594 line of the orange HeNe laser excites Compound 7. The 633 line of the red HeNe laser and the 647 line of the Kr laser excite Compound 8. Laser diodes excite the dye embodiments where n=2 (e.g. Compounds 9 and 10). Thus, because of the range of dyes with detectably different colored fluorescence, a series of dyes of this invention can be used for simultaneous multiplexing, according to procedures known in the art.

The fluorescence of the novel dyes bound to DNA or RNA is enhanced at least about 9 fold. Typically fluorescence is enhanced at least about 100 fold, sometimes as much as 1000 fold or more, depending on the amount and purity of the dye present in the sample (Table 2). This significant increase in fluorescence intensity reduces or eliminates the problem of background fluorescence due to unbound dye, thus avoiding the necessity to separate the unbound dye before measuring the fluorescence. Even where the dyes are intrinsically fairly fluorescent, however, such that the enhancement in fluorescence quantum yield which results from binding to nucleic acid polymers is less than 10 fold (e.g. Compound 5), the significant shift in absorption maxima that results from such binding (see Table 2, FIG. 2) can be used to quantitatively or qualitatively measure the presence of nucleic acid polymers.

The strength of absorption and/or fluorescence is indicated by the extinction coefficient. The extinction coefficients for some of the representative compounds are tabulated in Table 2. The maximum extinction coefficient ($\epsilon_{max}$) for the unbound dyes is calculated from the longest wavelength absorption maximum according to the Beer-Lambert law based on the known concentration of the solutions. The extinction coefficient for the dye bound to DNA is calculated from the change in maximum absorbance compared to the dye in free aqueous solution. Typically the extinction coefficient for both bound and unbound dyes is between about 50,000 $M^{-1} cm^{-1}$ and about 150,000 $M^{-1} cm^{-1}$.

The change in spectral properties that signals that the dye has bound to nucleic acid polymers can be used to quantitatively or qualitatively evaluate the presence of nucleic acid polymers in solutions or in cells. To accomplish the evaluation of nucleic acid polymers in a sample, dye in a buffered solution is combined with the sample thought to contain nucleic acid polymers. Measurements of fluorescence or absorbance of the solution before and after the combination of the sample with nucleic acid polymers are compared. The fluorescence intensity of the nucleic acid-dye complex is proportional to the amount of nucleic acid polymer in the sample (FIG. 6). Measuring the fluorescence intensity can be used to provide a quantitative measurement of the DNA in a sample of cells (Example 5). Alternatively, the absorbance of the solutions with and without the addition of the nucleic acid polymers can be compared (Examples 3 and 6).

The corresponding decrease of fluorescence intensity can be used to qualitatively measure the disappearance of nucleic acid polymers, e.g. in response to the presence of an enzyme such as DNAase that hydrolyses the nucleic acid polymers (Example 5). The fluorescence of the solution containing dye and nucleic acid polymers is compared with the fluorescence of the solution after the addition of a hydrolysing enzyme.

Because the dyes do not readily cross the cell membrane of a healthy living cell, the detection of fluorescence in a sample of whole cells can also be used qualitatively as an indication of the viability of cells in the sample. Cell death or toxicity usually results in loss of cell membrane integrity. When the cell membrane is damaged, the nucleic acid polymers inside the cell become accessible to the dye. Thus, the fluorescence of single cells in a sample is an indicator that DNA content of the cells has become accessible because the cell membrane of such cells is not functioning normally, i.e. the fluorescent cells are not viable cells (Example 7).

The intensity of fluorescence can be used to measure the effect of a cytotoxic event including exposure to a chemical reagent, the addition of a biological agent, or other change in environmental condition that results in membrane disruption. Many chemical reagents are known to be cytotoxic, including organic solvents, surfactants, toxins, ionophores, drugs, mitochondrial uncouplers, acids and bases, chaotropic ions, enzymetic inhibitors, oxidizing and reducing agents, etc. Biological agents known to be cytotoxic include cytotoxic cells such as cytotoxic T lymphocytes or natural killer cells, complements, some lectins, bacterial or fungal antibiotics or toxins, and others. Conditions known to cause cell death include hyperthermia, hypothermia, freezing, hypoxia, ionizing radiation, light, hypoosmotic and hyperosmotic shock, compression, decompression and others. The effect of a cytotoxic event can be observed over time, or after a fixed period of time.

To measure the effect of a cytotoxic event that involves the addition of a cytotoxic reagent, a stock solution of the reagent is prepared at a concentration greater that what is expected to be a toxic dose and this is added to the cells or tissue in a suitable medium. Typically various concentrations of the reagent are added from 0 to greater than a toxic dose. Toxicity can most conveniently be measured using a fluorescence plate reader such as a Millipore CytoFluor 2300 which has a high capacity for collecting data at multiple wavelengths of emission either for multiple samples in up to 96 wells or in a time based measurement in one or a few wells. Other toxic conditions such as temperature, ionic composition, radiation or cytotoxic cells can be determined by similar measurements.

The monomer dyes of the instant invention also have the additional and unexpected advantage of not experiencing optical deterioration in aqueous solutions, unlike the related dimer compounds. A problem documented with the cyanine homodimer nuclear stains such as described in the patent application DIMERS OF UNSYMMETRICAL CYANINE DYES (Ser. No. 761,177, filed 1991 by Yue, et al.) is that the absorbance of the dyes in aqueous solutions decreases quite rapidly (about 50% in 2 hours) over time periods required for most experiments. In the case of the monomer compounds of the invention, however, the decrease in absorbance observed is only about 1% in 2 hours.

The following examples are intended to illustrate specific means of practicing the invention. They are included as representative of the scope of the invention and are not intended to be exclusive.

EXAMPLE 1

ATTACHMENT OF THE CATIONIC SIDE CHAIN (Compound 4)

The following synthetic scheme is followed:

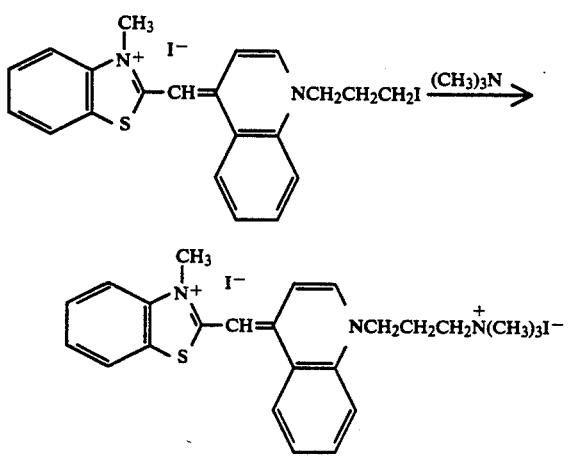

To 1.0 g of 1'-(3'-iodopropyl)-3-methyl-thia-4'-cyanine iodide (D) (prepared according to methods known in the art e.g. Brooker, et al. J. AM. CHEM. SOC. 64, 199 (1942)) in 25 mL of methanol, 6 mL of a 25% solution of trimethylamine in methanol (about 10 equivalents) is added and the resulting mixture is heated in a sealed tube at 90°–100° C. for 4 hours. The reaction mixture is cooled and the crude product is collected by suction filtration. The product is then further purified by recrystallization to yield Compound 4.

Precursors A, B, C, E, F, G, H, J, K, L, M (Table 1) are used to prepare Compounds 1-3 and 5-12 respectively according to the procedure of Example 1. For compounds with additional TAIL nitrogens, the appropriate alkylamine is substituted for trimethylamine in the procedure of Example 1. For example, Compounds 13 and 14 are prepared from precursors C and D, according to the procedure of Example 1, with N,N,N',N',tetramethyl-1,3 propanediamine substituted for trimethylamine. Following this condensation, the terminal nitrogen is quaternized by reaction with an alkyl halide, alkyl sulfate or alkyl sulfonate such as methyl iodide, dimethyl sulfate or methyl p-toluene sulfonate.

EXAMPLE 2

DETERMINATION OF ABSORPTION SPECTRA

Solutions of Compounds 1-8 are prepared by accurately weighing 5 mg quantities and dissolving in DMSO (dimethylsulfoxide) to give a 1 mg/ml stock solution. These solutions are diluted 200 fold into either methanol or a pH 7.4 buffer solution comprising 10 mM Tris, 1 mM EDTA and 50 mM NaCl. Each absorption spectrum is recorded on an IBM Instruments 9420 spectrophotometer. The absorption maximum for each dye without the presence of nucleic acid polymers ($\lambda_A$) is tabulated (Table 2). To the solutions of Compounds 1-8 in pH 7.4 buffer is added sufficient calf thymus DNA (Sigma Chemical Co. D-1501) stock solution calculated to yield a ratio of 50 DNA base pairs per dye molecule or greater. The absorption maximum for each dye bound to DNA is again tabulated (Table 2). Normalization of all spectra to a maximum absorbance of 1.0 by numerical rescaling demonstrates the absorption wavelength ranges for the different dyes (FIG. 1). Where the spectra are not rescaled, the changes in extinction coefficient and absorption wavelength range accompanying binding to DNA are clearly illustrated (FIG. 2).

EXAMPLE 3

DETERMINATION OF FLUORESCENCE SPECTRA

Solutions of each of Compounds 1-8 (0.4 μM) in pH 7.4 buffer (10 mM Tris, 1 mM EDTA and 50 mM NaCl) are prepared as above. Fluorescence emission spectra are recorded on an Alphascan spectrofluorometer (PTI Inc.) with excitation at approximately ($\lambda_A$-25 nm) where $\lambda_A$ is the absorption maximum of the dye bound to DNA. After sufficient calf thymus DNA (Sigma Chemical Co. D-1501) is added to yield a ratio of 50 DNA base pairs per dye molecule or greater, fluorescence emission spectra are again recorded (Table 2). The spectra are integrated and enhancement ratio (Table 2) is calculated as follows:

$$\text{Enhancement} = \left[ \frac{\text{Integrated Fluorescence + DNA}}{\text{Integrated Fluorescence - DNA}} \right] \left[ \frac{A-}{A+} \right]$$

in which the ratio (A−)/(A+) is the ratio of the absorbances for the free and bound dye respectively at the excitation wavelength. Normalization of all spectra to a maximum intensity of 100 by numerical rescaling demonstrates the fluorescence wavelength ranges for the different dyes (FIG. 3).

EXAMPLE 4

CALCULATION OF DYE/NUCLEIC ACID AFFINITY

Incremental amounts of calf thymus DNA in a binding buffer (10 mM phosphate pH 7.0 with 1 mM EDTA and 100 mM NaCl) are added to 0.22 μM and 0.1 μM solutions of Compound 4 in 10% ethanol, keeping concentrations constant. The fluorescence intensity (F) determined in a fluorescence plate reader (CytoFluor from Millipore Corporation), is measured versus DNA concentration expressed in terms of base pairs concentration (B). FIG. 4 gives the results of the DNA titrations versus constant concentrations of Compound 4. In all the titrations, [Dye]/[Base Pair] is always larger than 3 to fulfill the requirements of the partition model.

The nucleic acid/water partition coefficient ($K_p$) representing the relative affinity of the dye for DNA is calculated from the fluorescence data according to the following formula:

$$1/F = [5.6 \cdot 10^7/(K_p F_o)](1/B) + 1/F_o$$

where $5.6 \cdot 10^7$ (μM) is water molar concentration; B is the concentration of base pairs; and $F_o$ is the fluorescence enhancement at saturation. Table 3 gives the $K_p$ values of representative dyes via the partition model in the presence of 10% ethanol. A comparison of Compounds X, 4, and 13 shows that the affinity of the subject dyes for DNA increases with the addition and lengthening of the cationic side chain.

TABLE 3

Partition Coefficients of Representative Dyes

| Dye | Dye Conc.[2] | EX(nm)[2] | EM(nm)[2] | Sensitivity[2] | $K_P$ |
|---|---|---|---|---|---|
| Cmpd. X[3] | 0.1 μM | 485 | 530 | 4 | $4.8 \cdot 10^6$ |
| Cmpd. 4 | 0.1 μM | 485 | 530 | 4 | $2.0 \cdot 10^7$ |
| Cmpd. 13 | 0.1 μM | 485 | 530 | 4 | $4.2 \cdot 10^7$ |
| Cmpd. 7 | 0.1 μM | 590 | 645 | 4 | $3.3 \cdot 10^6$ |
| Cmpd. 2 | 0.1 μM | 485 | 530 | 5 | $3.2 \cdot 10^6$ |
| Cmpd. 3 | 0.1 μM | 485 | 530 | 4 | $8.6 \cdot 10^6$ |
| Cmpd. 8 | 0.1 μM | 590 | 645 | 4 | $6.2 \cdot 10^6$ |
| Cmpd. 6 | 0.1 μM | 560 | 645 | 3 | $4.8 \cdot 10^6$ |
| Cmpd. 1 | 0.1 μM | 392 | 460 | 5 | $2.0 \cdot 10^6$ |
| Et-Et[1] | 10 nM | 490 | 625 | — | $5.0 \cdot 10^8$ |

[1] Ethidium homodimer (included for comparision purposes only)
[2] Conditions used in $K_P$ determinations.
[3] Same structure as Compound 4 but without cationic side chain

EXAMPLE 5

ANALYSIS OF CELLULAR DNA CONTENT

The method of Rago et al. [Analytical Biochemistry 191, 31 (1990)] is adapted for use with the nucleotide-specific stain Compound 3. 3T3 cells (a mouse fibroblast cell line) are aliquoted into 96-well microtiter plates and allowed to adhere over a period of 4 hours. Cell numbers used are between 100 and 100,000 in 100 μl of Dulbecco's Modified Eagle Medium (DMEM). After attachment of cells, the plates are inverted onto toweling to remove the medium and stored frozen at −80° C.

For fluorescence analysis, 100 μl of distilled water is added to each well and the plates incubated at 37° C. for one hour, frozen at −80° C. then thawed to room temperature. The freeze/thaw protocol lyses the cells and releases the DNA into solution. 100 μl of 10 μM Compound 3 in TNE buffer (2 M NaCl, 10 mM TRIS, 1 mM EDTA pH 7.4) is added to each well and the plates scanned in a Cytofluor 2350 microtiter plate reader (Millipore Corp.) with excitation at 485 nm and emission detected at 530 nm. A linear increase of fluorescence with cell number is demonstrated (FIG. 5, open circles).

To confirm analytical specificity for DNA, half of the wells are treated with 20 μg/ml DNAse 1 (an enzyme which specifically hydrolyses both double and single stranded DNA) for one hour at 37° C in DNAse 1 buffer (10 mM $MnCl_2$, 50 mM TRIS, pH 7.7). This treatment eliminates more than 95% of the Compound 3 fluorescence (FIG. 5, filled circles).

EXAMPLE 6

TITRATION OF DNA IN SOLUTION

A solution of Compound 3 in buffer (10 mM Tris, 1 mM EDTA, 50 mM NaCl pH 7.4) is prepared according to procedures described above. The dye concentration in buffer is 1 μM. DNA (Calf Thymus DNA, Sigma Chemical Co. Product D-1501) is diluted from a 250 μg/ml stock solution (based on $A_{260\ nm} = 1.0 = 50$ μg/ml). Fluorescence measurements are carried out on a Millipore Cytofluor 2300 microtiter plate reader using excitation at 485 nm (bandpass 20 nm) and emission detection at 530 nm (bandpass 25 nm). Fluorescence intensity is plotted against DNA concentration expressed in μg/mL (FIG. 6). The linear analytical range is 0.0025 to 1.0 μg/mL (or 0.5 to 200 ng total DNA in the 200 μL experimental samples).

EXAMPLE 7

QUANTITATIVE FLUORIMETRIC DETERMINATION OF DEAD CELLS

Cell line:
P3×63Ag8.653 (IgG, non-secreting mouse myeloma) from a BALB/c mouse. Medium for propagation: Dulbecco's modified Eagle's medium with 10% calf serum, 1% HEPES Buffer solution, 1% L-Glutamine, and 0.5% Gentamicin.

Procedure:
Allow the cells to propagate for 3 to 4 days. Wash the cells 2 times in phosphate buffered saline (PBS) and centrifuge at 700 rpm for 10 minutes. Resuspend in PBS. Count the cells by trypan blue exclusion using a hemocytometer. Determine viability and adjust the cell concentration to $1.2 \times 10^6$ cells/ml. Divide the cells into two populations. Kill one population, for example by heating to 60° C. for 15 minutes. Readjust the cell concentration to 600,000 cells/ml. Aliquot a known numbers of cells into a 96-well microtiter plate. Add PBS to the wells so that the volume is 200 μl. Add 100 μl of 6 μM of the subject dye to each sample well so that the final concentration of dye is 2 μM. Read the fluorescence versus cell number on a fluorescence microtiter plate reader (for example, Millipore Cytofluor 2300) using a suitable combination of excitation and emission filters. For compounds 3 and 4 excitation at 485 nm and emission detection at 530 nm is suitable. The linear proportionality of fluorescence signal to number of dead cells may be used to quantitatively assess cell viability.

It is to be understood that, while the foregoing invention has been described in detail by way of illustration and example, numerous modifications, substitutions, and alterations are possible without departing from the spirit and scope of the invention as described in the following claims.

What is claimed is:

1. A compound of the formula:

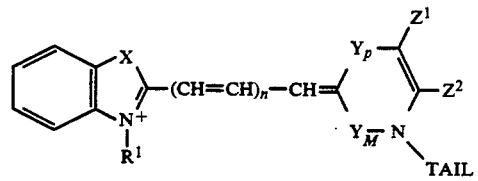

where $R^1$ is an alkyl group having 1–6 carbons;

X is O, S, or $NR^2$, where $R^2$ is an alkyl group having 1–6 carbons, or $CR^3R^4$, where $R^3$ and $R^4$, which may be the same or different, are alkyl groups having 1–6 carbons;

n=0–2;

Y is HC=CH, where each of P and M=0 or 1, such that P+M=1;

$Z^1$ and $Z^2$, which may be the same or different, are independently hydrogen, an alkyl group having 1–6 carbons, or aryl, or $Z^1$ and $Z^2$ taken in combination complete a 6-membered aromatic ring; and TAIL is an aminoalkyl chain containing a backbone of two to about 42 carbons and 1–5 positively charged nitrogens intermittently or equally spaced within the backbone, such that there are at least two carbons between sequential nitrogens.

2. A compound, as claimed in claim 1, where TAIL has the general formula:

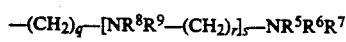

—$(CH_2)_q$—$[NR^8R^9$—$(CH_2)_r]_s$—$NR^5R^6R^7$ where $R^5$, $R^6$, and $R^7$, which may be the same or different, are independently hydrogen or an alkyl group having 1-6 carbons;
$R^8$ and $R^9$, which may be the same or different, are independently hydrogen or an alkyl group having 1-6 carbons; and
$q=2-12$; $r=2-6$; and $s=0-4$.

3. A compound, as claimed in claim 2, where X is S.
4. A compound, as claimed in claim 2, where X is O.
5. A compound, as claimed in claim 2, where $n=0$.
6. A compound, as claimed in claim 2, where $n=1$.
7. A compound, as claimed in claim 2, where $n=2$.
8. A compound, as claimed in claim 2, where q and r are each less than 5.
9. A compound, as claimed in claim 8, of the formula:

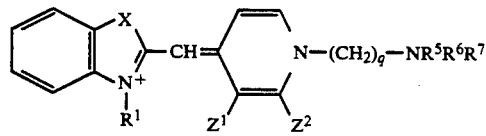

where $R^1$, $R^2$, $R^3$, and $R^4$, which may be the same or different, are methyl or ethyl; and
$R^5$, $R^6$, and $R^7$, which may be the same or different, are hydrogen, methyl, or ethyl.

10. A compound, as claimed in claim 8, of the formula:

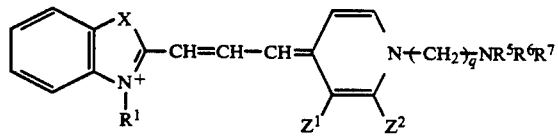

where $R^1$, $R^2$, $R^3$, and $R^4$, which may be the same or different, are methyl or ethyl; and
$R^5$, $R^6$, and $R^7$, which may be the same or different, are hydrogen, methyl, or ethyl.

11. A compound, as claimed in claim 8, of the formula:

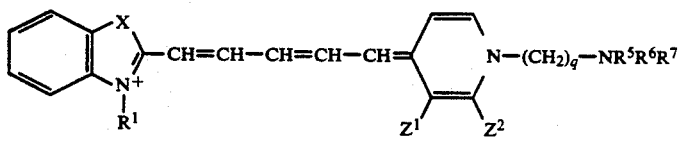

where $R^1$, $R^2$, $R^3$, and $R^4$, which may be the same or different, are methyl or ethyl; and
$R^5$, $R^6$, and $R^7$, which may be the same or different, are hydrogen, methyl, or ethyl.

12. A compound, as claimed in claim 8, of the formula:

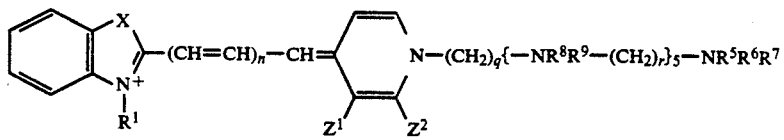

where $R^1$ is methyl or ethyl;
$n=0$, 1, or 2;
$s=0-2$; and
$R^5$, $R^6$, $R^7$, $R^8$, and $R^9$, which may be the same or different, are hydrogen, methyl, or ethyl.

13. A compound, as claimed in claim 12, of the formula:

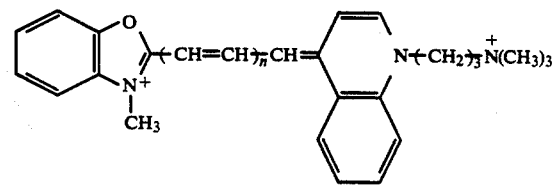

where $n=0-2$.

14. A compound, as claimed in claim 12, of the formula:

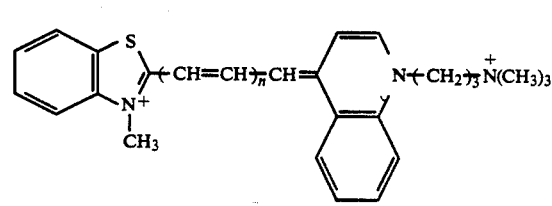

where $n=0-2$.

15. A compound comprising a nucleic acid polymer bound to a dye of the general formula:

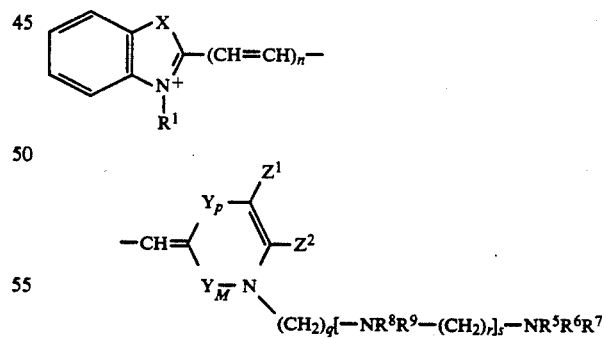

where $R^1$ is an alkyl group having 1-6 carbons;

X is O, S, or $NR^2$, where $R^2$ is an alkyl group having 1-6 carbons, or $CR^3R^4$, where $R^3$ and $R^4$, which may be the same or different, are alkyl groups having 1-6 carbons;

n=0-2;

Y is HC=CH, where each of P and M=0 or 1, such that P+M=1;

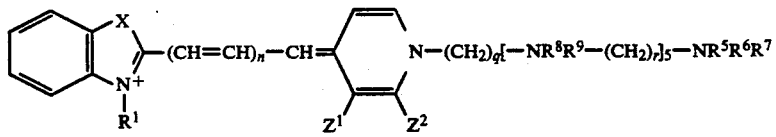

$Z^1$ and $Z^2$, which may be the same or different, are independently hydrogen, an alkyl group having 1-6 carbons, or aryl, or $Z^1$ and $Z^2$ taken in combination complete a 6-membered aromatic ring;

$R^5$, $R^6$, and $R^7$, which may be the same or different, are independently hydrogen or an alkyl group having 1-6 carbons;

$R^8$ and $R^8$, which may be the same or different, are independently hydrogen or an alkyl group having 1-6 carbons; and q=2-12; r=2-6; and s=0-4;

with enhanced fluorescence of greater than about 5 fold.

16. A compound, as claimed in claim 15, where the dye has the formula:

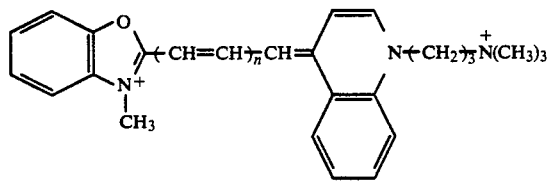

where n=0-2.

17. A compound, as claimed in claim 15, where the dye has the formula:

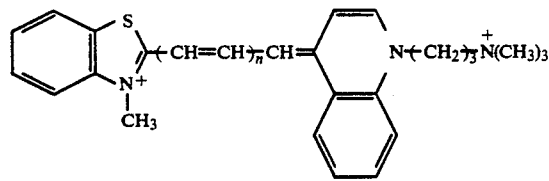

where n=0-2.

18. A compound as claimed in claim 15, where the nucleic acid polymer is DNA.

19. A compound as claimed in claim 15, where the nucleic acid polymer is RNA.

20. A compound, as claimed in claim 15, where the enhanced fluorescence results from loss of cell membrane integrity.

21. A compound, as claimed in claim 15, where the dye has the formula:

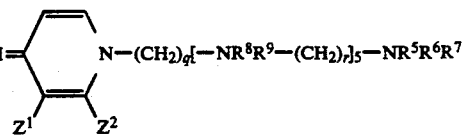

where $R^1$ is methyl or ethyl;

X is O or S;

n=0-2;

$Z^1$ and $Z^2$, which may be the same or different, are independently hydrogen or $Z^1$ and $Z^2$ taken in combination complete a 6-membered aromatic ring;

q and r are less than 5;

s=0-2; and $R^5$, $R^6$, $R^7$, $R^8$, and $R^9$, which may be the same or different, are independently hydrogen, methyl or ethyl.

22. A compound, as claimed in claim 15, where the dye has the formula:

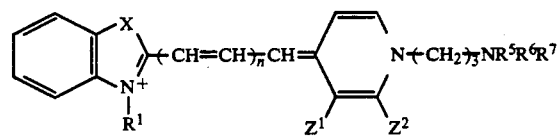

where $R^1$ is methyl or ethyl;

X is O or S;

n =0-2;

$Z^1$ and $Z^2$, which may be the same or different, are independently hydrogen or $Z^1$ and $Z^2$ taken in combination complete a 6-membered aromatic ring; and $R^5$, $R^6$, and $R^7$, which may be the same or different, are independently hydrogen, methyl or ethyl.

23. A compound, as claimed in claim 15, where the dye has the formula:

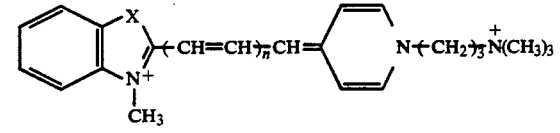

where X=O or S, and n=0-2.

* * * * *

UNITED STATES PATENT AND TRADEMARK OFFICE
CERTIFICATE OF CORRECTION

PATENT NO. : 5,321,130
DATED : June 14, 1994
INVENTOR(S) : Yue et al.

It is certified that error appears in the above-indentified patent and that said Letters Patent is hereby corrected as shown below:

Column 18, lines 3-10, in the formula, the subscript "5" should be --s--, such that the formula appears as follows:

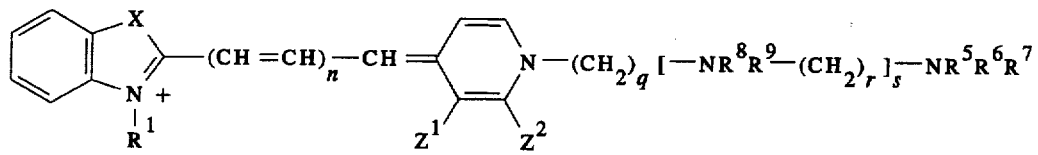

Column 20, lines 8-15, in the formula, the subscript "5" should be --s--, such that the formula appears as follows:

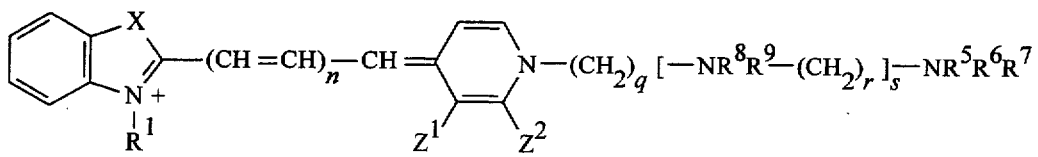

Signed and Sealed this

Twenty-second Day of August, 2000

Attest:

Q. TODD DICKINSON

*Attesting Officer*      *Director of Patents and Trademarks*